(12) United States Patent
Nakamura et al.

(10) Patent No.: US 9,678,101 B2
(45) Date of Patent: Jun. 13, 2017

(54) PHYSICAL QUANTITY DETECTION APPARATUS

(71) Applicant: Hitachi Automotive Systems, Ltd., Hitachinaka-shi, Ibaraki (JP)

(72) Inventors: Toshiaki Nakamura, Tokyo (JP); Masahide Hayashi, Hitachinaka (JP); Masaru Yamashita, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 366 days.

(21) Appl. No.: 14/356,769

(22) PCT Filed: Dec. 3, 2012

(86) PCT No.: PCT/JP2012/081233
§ 371 (c)(1),
(2) Date: May 7, 2014

(87) PCT Pub. No.: WO2013/111454
PCT Pub. Date: Aug. 1, 2013

(65) Prior Publication Data
US 2014/0336976 A1    Nov. 13, 2014

(30) Foreign Application Priority Data
Jan. 26, 2012  (JP) ................. 2012-013661

(51) Int. Cl.
*G01P 15/00* (2006.01)
*G01P 21/00* (2006.01)
(Continued)

(52) U.S. Cl.
CPC .......... *G01P 21/00* (2013.01); *G01C 19/5776* (2013.01); *G01P 3/00* (2013.01);
(Continued)

(58) Field of Classification Search
CPC ........ G01P 15/097; G01P 15/18; G01P 15/00; G01P 21/00; G01P 15/125; G01P 3/00; G01C 19/5776
See application file for complete search history.

(56) References Cited

U.S. PATENT DOCUMENTS 6,167,547 A * 12/2000 Senechal ............ G05B 23/0256
714/732
7,730,782 B2 * 6/2010 Uemura ................. G01C 19/56
73/504.12
(Continued)

FOREIGN PATENT DOCUMENTS

JP  2002-188921 A   7/2002
JP  4311496 B1     8/2009
(Continued)

OTHER PUBLICATIONS

International Search Report with English translation dated Jan. 15, 2013 (5 pages).

*Primary Examiner* — Elias Desta
(74) *Attorney, Agent, or Firm* — Crowell & Moring LLP

(57) ABSTRACT

Provided is a sensor signal output apparatus that outputs a sensor signal at times of the sensor being in steady operation and outputs the operational status of the sensor instead of the sensor signal when the sensor is at fault or in non-steady operation in order to thereby to have a receiver machine obtain a correct sensor signal. The sensor signal output apparatus includes a sensor detecting a physical quantity, a diagnosis part diagnosing the operating state of the sensor, and a communication part transmitting the result of detection by the sensor and the result of diagnosis by the diagnosis part. When the sensor is determined to be normally operating, the communication part selectively outputs the result of detection by the sensor. When the sensor is not determined to be normally operating, the communication (Continued)

part selectively outputs a signal indicative of the operating state of the sensor.

6 Claims, 7 Drawing Sheets

(51) Int. Cl.
    *G01C 19/5776*    (2012.01)
    *G01P 15/125*     (2006.01)
    *G01P 3/00*       (2006.01)
    *G01P 15/097*     (2006.01)
    *G01P 15/18*      (2013.01)

(52) U.S. Cl.
    CPC ............ *G01P 15/00* (2013.01); *G01P 15/097* (2013.01); *G01P 15/125* (2013.01); *G01P 15/18* (2013.01)

(56) References Cited

U.S. PATENT DOCUMENTS

2008/0081958 A1*   4/2008   Denison ............... A61N 1/3706
                                                      600/300
2010/0083757 A1    4/2010   Uemura

FOREIGN PATENT DOCUMENTS

| JP | 4358301 B1 | 11/2009 |
|---|---|---|
| JP | 2010-286369 A | 12/2010 |

\* cited by examiner

FIG.4

| | OPERATIONAL STATUS | DETERMINATION CRITERIA | TIMER VALUES | | | ANGULAR VELOCITY OUTPUT | ACCELERATION OUTPUT |
|---|---|---|---|---|---|---|---|
| | | | KT | YT | GT | | |
| 1 | STARTUP | AFTER INPUT OF RESET=0, AT LEAST ONE OF THE FOLLOWING DIAGNOSIS FLAGS IS "1": - ABNORMALITY IN DRIVE FREQUENCY - ABNORMALITY IN DRIVE AMPLITUDE | TD | 0 | 0 | 8001h | 8001h |
| | LPF IN STATIC PERIOD FOLLOWING THE ABOVE STATUS | PASS ALL DIAGNOSES | >0 | 0 | 0 | 8001h | 8001h |
| 2 | INITIAL DIAGNOSIS | INITIAL DIAGNOSIS INSTRUCTION=1 | TD | 0 | 0 | 7FFEh | 7FFEh |
| | LPF IN STATIC STATE FOLLOWING THE ABOVE STATUS | TD PERIOD IMMEDIATELY THEREAFTER | >0 | 0 | 0 | 8001h | 8001h |
| 3 | FAIL ANGULAR VELOCITY DIAGNOSIS | AT LEAST ONE OF THE FOLLOWING DIAGNOSIS FLAGS IS "1": - ABNORMALITY IN DRIVE FREQUENCY - ABNORMALITY IN DRIVE AMPLITUDE - ABNORMALITY IN DETECTED SERVO | 0 | TD | 0 | 7FFFh | SENSOR OUTPUT |
| | LPF IN STATIC STATE FOLLOWING THE ABOVE STATUS | PASS ALL DIAGNOSES | 0 | >0 | 0 | 7FFFh | SENSOR OUTPUT |
| 4 | FAIL ACCELERATION DIAGNOSIS | THE FOLLOWING DIAGNOSIS FLAG IS "1": - ABNORMALITY IN ACCELERATION OUTPUT | 0 | 0 | TD | SENSOR OUTPUT | 7FFFh |
| | LPF IN STATIC STATE FOLLOWING THE ABOVE STATUS | PASS ALL DIAGNOSES | 0 | 0 | >0 | SENSOR OUTPUT | 7FFFh |
| 5 | FAIL PROGRAM AND RAM DIAGNOSES | AT LEAST ONE OF THE FOLLOWING DIAGNOSIS FLAGS IS "1": - ABNORMALITY IN PROM - ABNORMALITY IN RAM | 0 | TD | TD | 7FFFh | 7FFFh |
| | LPF IN STATIC STATE FOLLOWING THE ABOVE STATUS | PASS ALL DIAGNOSES | 0 | >0 | >0 | 7FFFh | 7FFFh |
| 6 | SENSOR OPERATION | PASS ALL DIAGNOSES | 0 | 0 | 0 | SENSOR OUTPUT | SENSOR OUTPUT |

KT: STARTUP LOW-PASS FILTER STATIC TIMER
YT: ANGULAR VELOCITY LOW-PASS FILTER STATIC TIMER
GT: ACCELERATION LOW-PASS FILTER STATIC TIMER

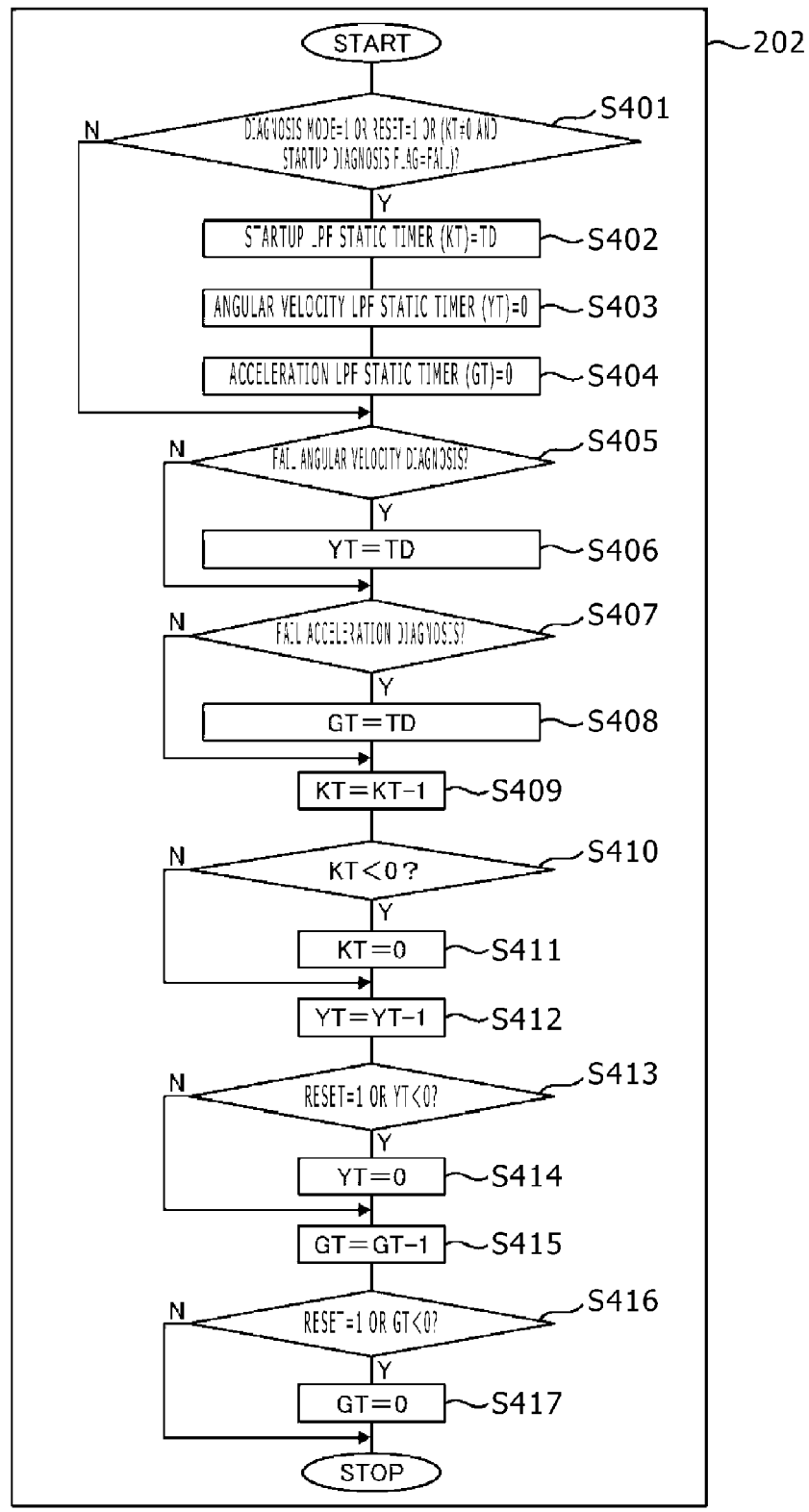

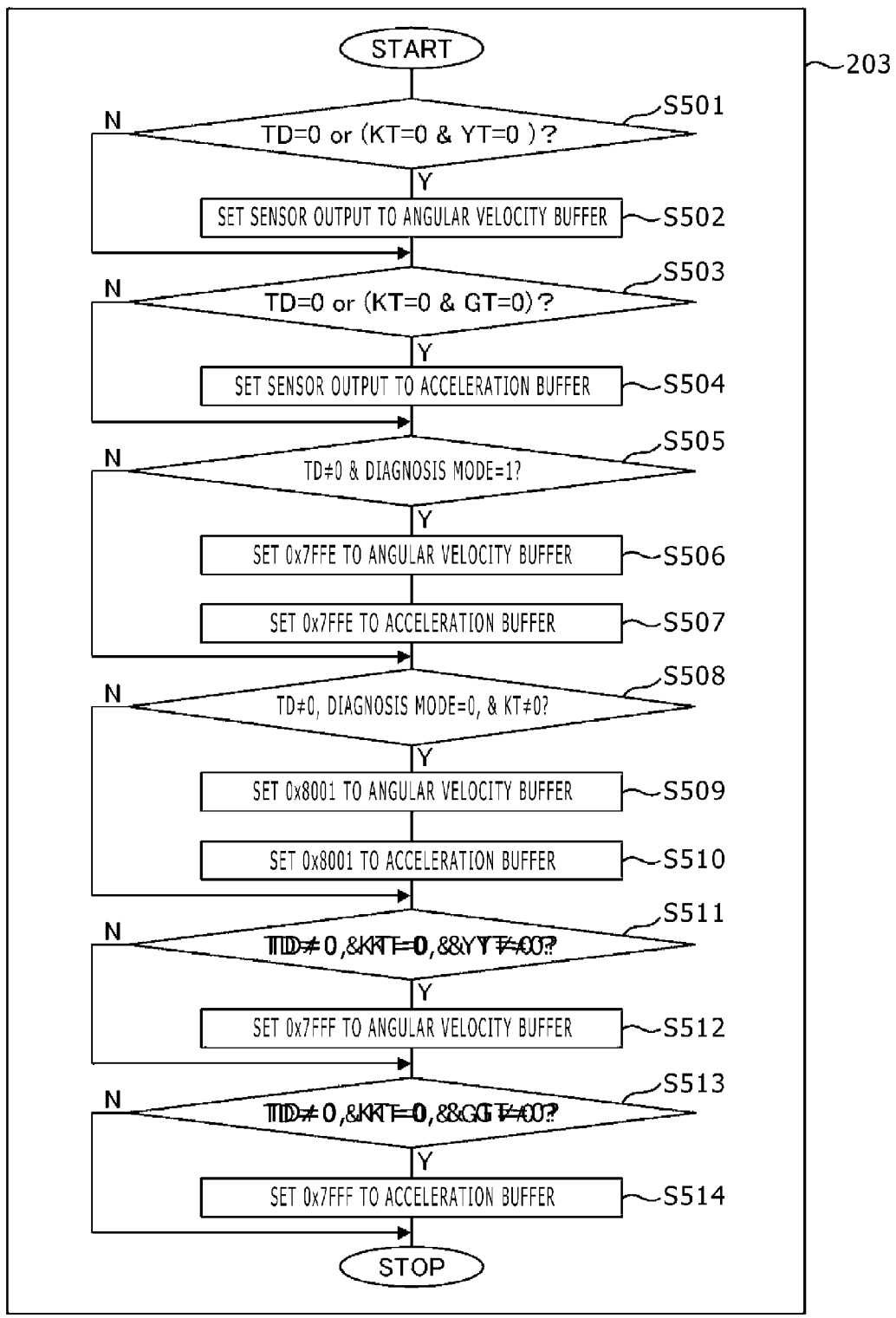

FIG. 10
(a) AT STARTUP
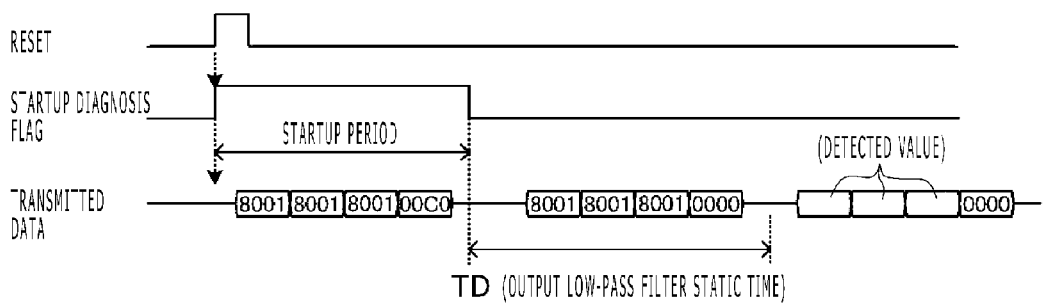
(b) AT THE TIME OF INITIAL DIAGNOSIS (WHEN DIAGNOSIS RESULT IS PASS)
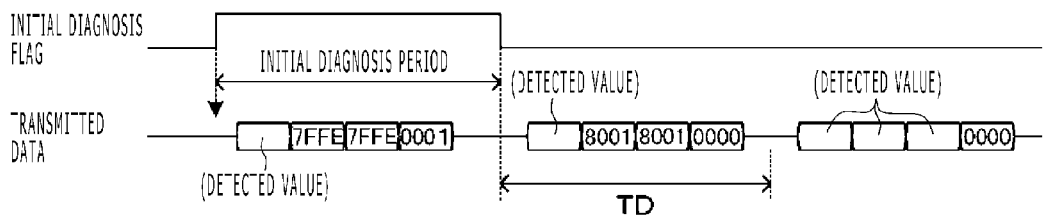
(c) AT THE TIME OF ACCELERATION INITIAL DIAGNOSIS (WHEN DIAGNOSIS RESULT IS FAIL)
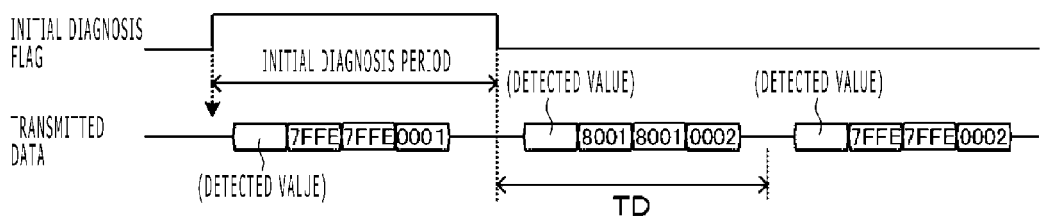
(d) WHEN FAILING ANGULAR VELOCITY DIAGNOSIS
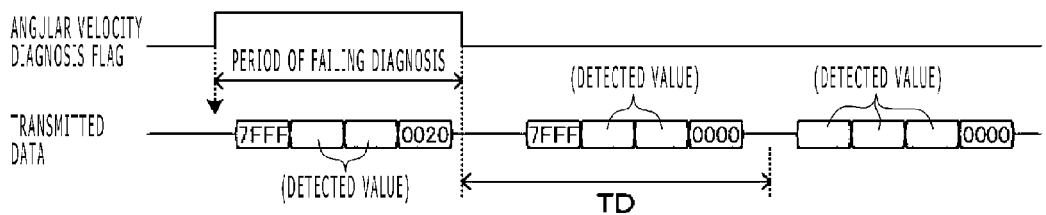

PHYSICAL QUANTITY DETECTION APPARATUS

TECHNICAL FIELD

The present invention relates to an apparatus that detects physical quantities, and particularly to a physical quantity detection apparatus suitable for detecting physical quantities such as angular velocity and acceleration.

BACKGROUND ART

To ensure the safety of a vehicle during travel requires provision of a sensor that detects angular velocity and acceleration. When such a sensor is installed in an environment like an engine room where the range of temperature variations is extensive and vibrations and electromagnetic noises are significantly influential, it is necessary to devise measures to keep the sensor outputs highly reliable.

The sensors used in such circumstances are thus internally equipped with self-diagnostic functions that output diagnostic information along with the sensor outputs to an external device. On the basis of the received diagnostic information the external device determines if received sensor output is normal and whether to adopt the sensor output.

Patent Literature 1 and 2 describe sensors which detect physical quantities such as angular velocity and acceleration and which transmit the results of such detection and intra-sensor fault diagnosis to the external device.

In the technique described in Patent Literature 1, a fault diagnosis signal given at the same point in time as a sensor signal is output by an output circuit on a time-division basis. The external device determines whether the sensor signal to be output at the next point in time is normal according to the fault diagnosis signal.

According to the technique described in Patent Literature 2, if the sensor part is determined to be at fault, the sensor signal is output from a first output terminal as a signal outside the normal output voltage range, and the fault diagnosis signal is output from a second output terminal to the external device.

PRIOR ART LITERATURE

Patent Documents

Patent Document 1: JP-4311496-B
Patent Document 2: JP-4358301-B

SUMMARY OF THE INVENTION

Problems to be Solved by the Invention

The technique in Patent Literature 1, however, has a problem in which the external device may determine a normal sensor signal as an abnormal value or an abnormal sensor signal as a normal value when the fault diagnosis signal output on a time-division basis has become erroneous due to communication channel noises for example. The technique in Patent Literature 2 involves having the sensor signal output as a non-steady value at the time of breakdown, so as to avoid the problem of the fault diagnosis signal from being a normal value due to noises as is the case with the technique of Patent Literature 1. The technique in Patent Literature 2 still has a problem that the external device can erroneously determine a sensor signal in a non-steady state due to causes other than failure as a normal value.

An object of the present invention is to provide a physical quantity detection apparatus having improved reliability.

Means for Solving the Problem

According to the present invention, there is provided a sensor signal output apparatus including: a sensor detecting a physical quantity; a diagnosis part diagnosing the running status of the sensor; and a communication part transmitting the result of detection by the sensor and the result of diagnosis by the diagnosis part. When the sensor is determined to be normally operating, the communication part selectively outputs the result of detection by the sensor. When the sensor is not determined to be normally operating, the communication part selectively outputs a signal indicative of an operational status of the sensor.

Advantages

The present invention enables a physical quantity detection apparatus offering improved reliability to be provided.

BRIEF DESCRIPTION OF THE DRAWINGS

FIG. 4 is a tabular view listing the operational status of the sensor and the determination criteria for the status along with sensor outputs.

FIG. 5 is an operation flowchart of an operation determination part.

FIG. 6 is an operation flowchart of an output control part.

FIG. 10 is a set of diagrams showing typical data transmitted by the communication part in accordance with the operational status of the sensor.

MODE FOR CARRYING OUT THE INVENTION

Figure 1:
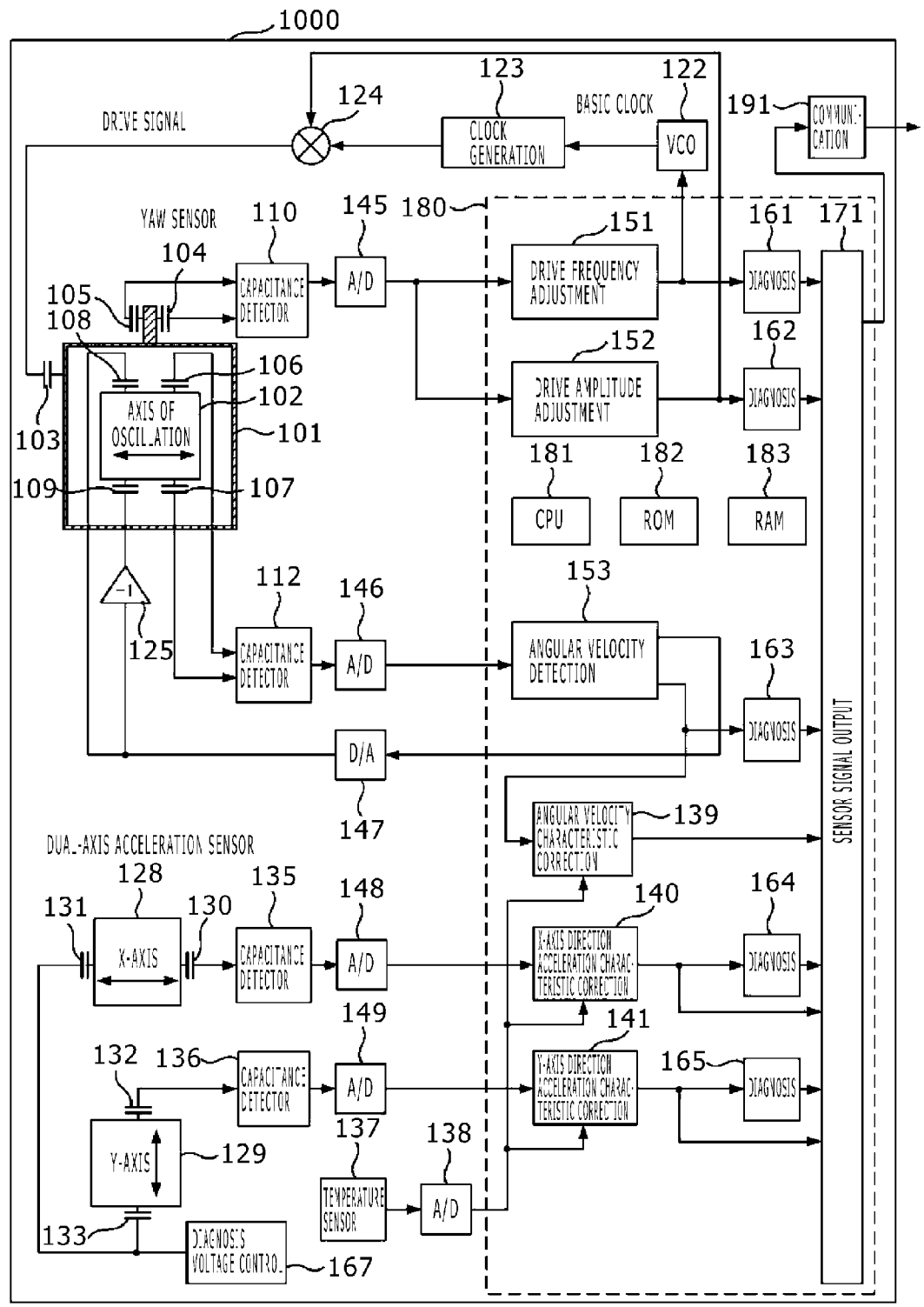
FIG. 1 is a control circuit diagram of a sensor signal output apparatus as a first embodiment of the present invention.

Explained below with FIG. 1 is a control circuit diagram of a physical quantity detection apparatus 1000 as one embodiment of the present invention.

In FIG. 1, an angular velocity sensor 101 for detecting angular velocity includes an oscillator 102, a fixed electrode 103, electrodes 104 and 105, fixed electrodes 106 and 107, and fixed electrodes 108 and 109.

The oscillator 102 has predetermined mass and oscillates along the axis of oscillation at a predetermined oscillation frequency. The fixed electrode 103 exerts electrostatic force to adjust the oscillation amplitude and oscillation frequency of the oscillator 102 in the oscillating direction. The electrodes 104 and 105 detect the oscillation amplitude and oscillation frequency of the oscillator 102 in terms of capacitance change. The fixed electrodes 106 and 107 detect as a capacitance change the displacement of the oscillator 102 in the direction perpendicular to the axis of oscillation, the displacement being caused by the Coriolis force generated when angular velocity is applied. The fixed electrodes 108 and 109 exert electrostatic force on the oscillator 102 in a manner canceling the Coriolis force wielded on the oscillator 102.

A capacitance detector 110 detects a difference between a first capacitance in the middle of the angular velocity sensor 101 and the electrode 104 on one hand, and a second capacitance in the middle of the angular velocity sensor 101 and the electrode 105 on the other hand in order to thereby detect the displacement in the direction of the vibrations exercised on the angular velocity sensor 101.

A drive frequency adjustment part 151 has an A/D converter 145 that transforms the output of the capacitance detector 110 to a digital signal, and an integrator that adds up the output of the A/D converter 145 at constant cycle length.

A drive amplitude adjustment part 152 has an integrator which acquires a difference between a predetermined reference amplitude value and the output of the A/D converter 145, and which adds up the acquired output at constant cycle length.

A capacitance detector 112 detects the difference between a first capacitance in the middle of the oscillator 102 and the fixed electrode 106 on the one hand, and a second capacitance in the middle of the oscillator 102 and the fixed electrode 107 on the other hand in order to thereby detect the displacement caused by the Coriolis force exerted on the oscillator 102 and convert the detected displacement to a digital signal.

An angular velocity detection part 153 has an A/D converter 146 that transforms the output of the capacitance detector 112 to a digital signal, and an integrator that adds up the output of the A/D converter 146 at constant cycle length.

A VCO (voltage-controlled oscillator) 122 outputs a basic clock having frequency corresponding to the output of the drive frequency adjustment part 151. A clock generation part 123 divides the output of the VCO 122 so as to output a drive signal and a detection signal Φ1.

A dual-axis acceleration sensor has oscillators 128 and 129, as well as electrodes 130 to 133.

The oscillator 128 is displaced when subjected to acceleration in the crosswise direction (referred to as the X-axis direction hereunder). The oscillator 129 is displaced when subjected to acceleration in the front-back direction (referred to as the Y-axis direction hereunder). The electrodes 130 and 132 detect the amount of displacement in the X-axis and the Y-axis directions in terms of capacitance change. The electrodes 131 and 133 apply voltages so as to forcibly displace the oscillators 128 and 129 in the X-axis and the Y-axis directions, respectively. Capacitance detectors 135 and 136 discover changes in capacitance caused by the displacement and output the detected changes as voltage. A/D converters 148 and 149 transform the voltages detected by the capacitance detectors 135 and 136 to digital signals. A temperature sensor 137 detects the ambient temperature and converts the detected temperature to a voltage to be output. An A/D converter 138 turns the output voltage of the temperature sensor 137 into a digital signal.

An angular velocity characteristic correction part 139, an X-axis direction acceleration characteristic correction part 140, and a Y-axis direction acceleration characteristic correction part 141 modify the result of angular velocity detection and that of acceleration detection in accordance with the output of the temperature sensor 137.

A diagnosis part 161 determines whether the drive frequency is normal on the basis of the output of the drive frequency adjustment part 151. A diagnosis part 162 determines whether the oscillations of the oscillator 12 along the axis of oscillation are normal on the basis of the output of the drive amplitude adjustment part 152. A diagnosis part 163 determines whether the angular velocity output is normal on the basis of the output of the angular velocity detection part 153. A diagnosis part 164 determines whether the acceleration sensor is normally operating on the basis of the output of the X-axis direction acceleration characteristic correction part 140. A diagnosis part 165 determines whether the acceleration sensor is normally operating on the basis of the output of the Y-axis direction acceleration characteristic correction part 141.

A diagnosis voltage control part 167 displaces forcibly the oscillators 128 and 129 in the X-axis and Y-axis directions, respectively, and applies voltages to the electrodes 131 and 133 so as to determine whether the acceleration sensor is normally operating.

A sensor signal output part 171 determines the operational status of the sensors on the basis of the outputs of the diagnosis parts 161 through 165. The sensor signal output part 171 outputs the signals of the angular velocity sensor and acceleration sensor if the sensors are determined to be in a steady state. If the sensors are determined to be in a non-steady state, the sensor signal output part 171 outputs a signal pattern corresponding to the operational status in effect.

A communication part 191 converts the output of the sensor signal output part 171 to a serial signal output transmitted to an external device of the physical quantity detection apparatus 1000.

The components shown enclosed by dotted lines in FIG. 1 may be implemented integrally in an arithmetic unit such as a microcomputer 180 which includes a CPU (Central Processing Unit) 181, a ROM (Read Only Memory) 182, and a RAM (Random Access Memory) 183.

The CPU 181 performs arithmetic functions of various functional parts included in the microcomputer 180. The ROM 182 retains programs executed by the CPU 181. The RAM 183 temporarily holds data and other resources needed when the CPU 181 carries out the programs.

The functional parts formed in the microcomputer 180 may be implemented either as the programs executed by the CPU 181 or for realizing the functions by use of hardware such as circuit devices. Also, rewritable logic circuits such as FPGA (Field Programmable Gate Array) may be used to implement the microcomputer 180 as well as functions equivalent to the functional parts included in the microcomputer 180.

Figure 2:
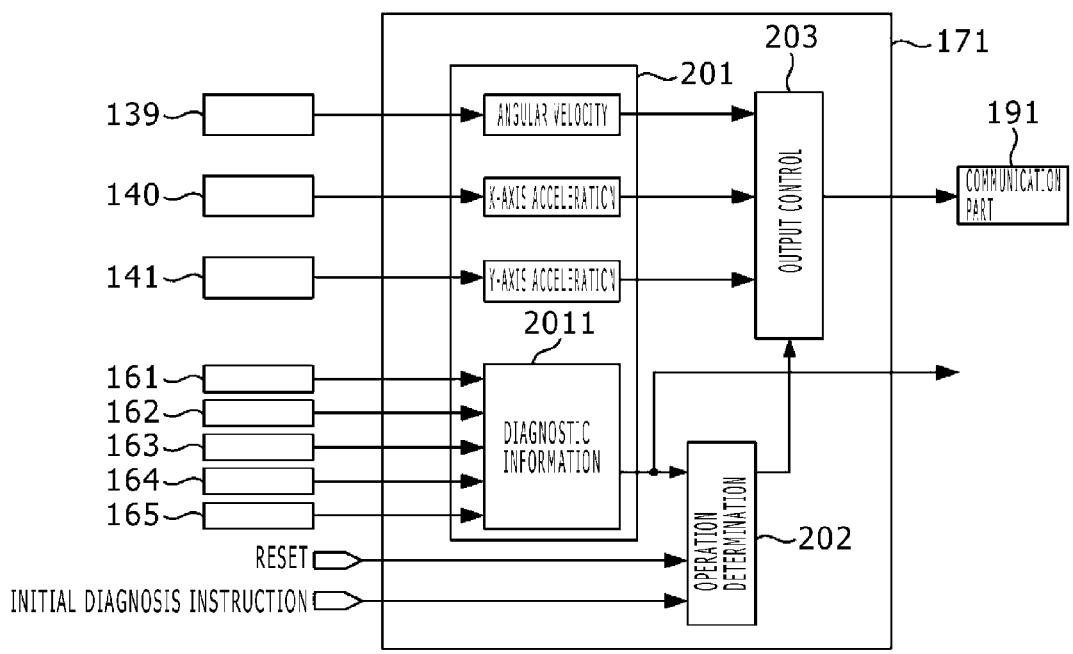
FIG. 2 is a functional block diagram of a sensor signal output part.

Explained below with FIG. 2 is the functionality of the sensor signal output part 171. The sensor signal output part 171 includes a data buffer 201, an operation determination part 202, and an output control part 203.

The data buffer 201 receives the result of detection by the angular velocity sensor 101 from the angular velocity characteristic correction part 139, in addition to the results of detection by the acceleration sensor in the relevant axis directions from the X-axis direction acceleration characteristic correction part 140 and Y-axis direction acceleration characteristic correction part 141. The data buffer 201 also receives the results of diagnosis on the respective sensors from the diagnosis parts 161 through 165.

The operation determination part 202 determines the intra-sensor operational status based on the diagnostic information stored in the data buffer 201. The output control part 203 outputs the result of the process to the communication part 191.

Figure 3:
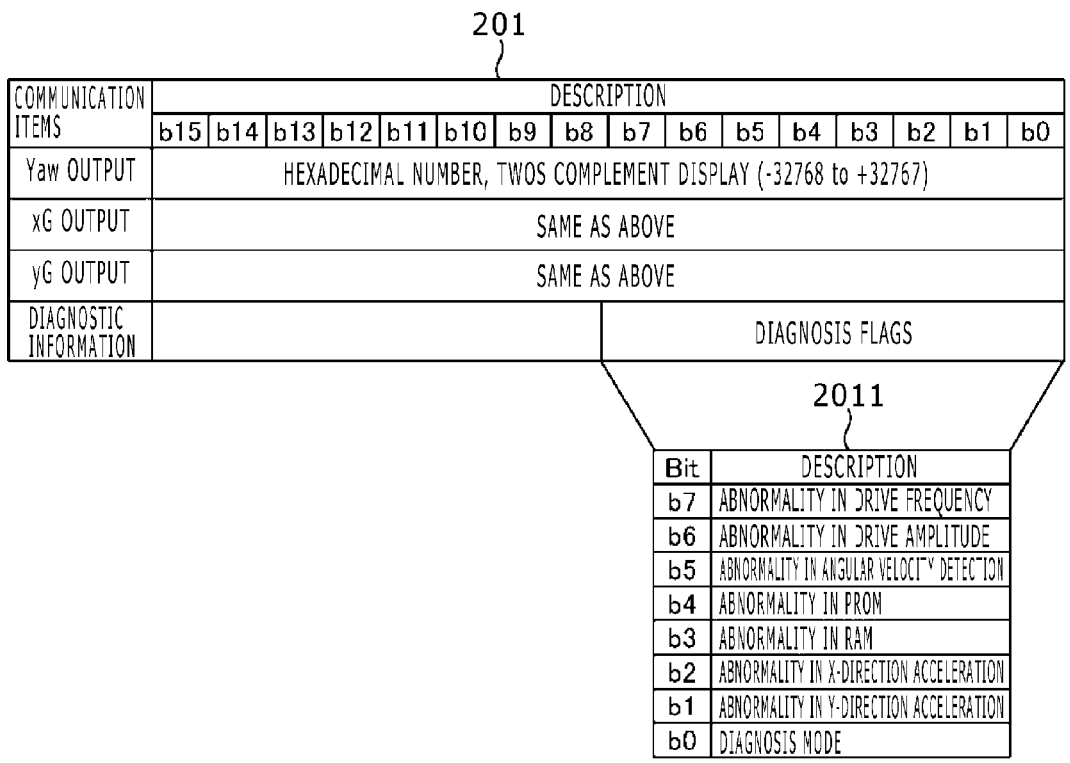
FIG. 3 is a diagram showing the format of data stored in a data buffer.

The format of the data held in the data buffer 201 is explained below with FIG. 3.

The angular velocity sensor 101 and dual-axis acceleration sensor output the results of their detection as 16-bit data. The results of the detection may be represented by positively and negatively signed values as twos complements, for example. Depending on the required degree of accuracy, the number of bits may be increased or decreased and the results of the detection may be presented in other suitable representational form.

The diagnostic information indicative of the result of diagnosis by each diagnosis part is formed as eight-bit data. Each of the bits represents the result of diagnosis on each of the following items as either 0 (normal) or 1 (abnormal):
(Bit b7) Drive frequency of the angular velocity sensor 101 (the result of diagnosis by the diagnosis part 161)
(Bit b6) Drive amplitude of the angular velocity sensor 101 (the result of diagnosis by the diagnosis part 162)
(Bit b5) Angular velocity detection function of the angular velocity sensor 101 (result of diagnosis by the diagnosis part 163)
(Bit b4) Result of diagnosis on the ROM 182 (as diagnosed by the CPU 181)
(Bit b3) Result of diagnosis on the RAM 133 (as diagnosed by the CPU 181)
(Bit b2) Acceleration detection function in the X-axis (crosswise) direction (the result of diagnosis by the diagnosis part 164)
(Bit b1) Acceleration detection function in the Y-axis (frontback) direction (the result of diagnosis by the diagnosis part 165)
(Bit b0) Initial diagnosis state detection function (externally input value of an initial diagnosis instruction signal)

FIG. 4 is a list of the operations of the operation determination part 202 and output control part 203. The operation determination part 202 determines the operational status from among those listed in FIG. 4 in accordance with the determination criteria, and sets values accordingly to a startup low-pass filter static timer (KT), an angular velocity low-pass filter static timer (YT), and an acceleration low-pass filter static timer (GT). Given the status of these three timer values, the output control part 203 determines the angular velocity output and acceleration output.

The flow of the operation performed by the operation determination part 202 is explained below with FIG. 5.
(Step S401)
If the operation determination part 202 has determined that a startup state is in effect due to any of the following conditions, the process moves to step S402: the initial diagnosis state is in effect; a reset signal is being input; and the startup low-pass filter static timer (KT) is set to a value other than "0" with the diagnosis flag bit b7 or b6 set to "1" (abnormal). Otherwise, it goes to step S405.
(Step S402)
The time TD required for the low-pass filter to reach a stable state is set to the startup low-pass filter static timer (KT).
(Step S403)
The value "0" is set to the angular velocity low-pass filter static timer (YT) that counts the time in which the low-pass filter reaches a static state after the result of angular velocity diagnosis has turned out PASS.
(Step S404)
The value "0" is set to the acceleration low-pass filter static timer (GT) that counts the time in which the low-pass filter reaches a static state after the result of acceleration diagnosis has turned out PASS.
(Step S405)
If the result of angular velocity diagnosis is FAIL, step S406 is reached. Otherwise, step S407 is reached.
(Step S406)
The time TD required for the low-pass filter to reach a stable state is set to the angular velocity low-pass filter static timer (YT).
(Step S407)
If the result of acceleration diagnosis is FAIL, step S408 is reached. Otherwise, step S409 is reached.
(Step S408)
The time TD required for the low-pass filter to reach a stable state is set to the acceleration low-pass filter static timer.
(Step S409)
The value "1" is subtracted from the value on the startup low-pass filter static timer (KT).
(Step S410)
If the value on the startup low-pass filter (LPF) static timer (KT) is smaller than "0," step S411 is reached. Otherwise, step S412 is reached.
(Step S411)
The value "0" is set to the startup low-pass filter static timer (KT).
(Step S412)
The value "1" is subtracted from the value on the angular velocity low-pass filter static timer (YT).
(Step S413)
If a reset signal is being input from the outside, or if the value on the angular velocity low-pass filter static timer (YT) is smaller than "0," step S414 is reached. Otherwise, step S415 is reached.
(Step S414)
The value "0" is set to the angular velocity low-pass filter static timer (YT).
(Step S415)
The value "1" is subtracted from the value on the acceleration low-pass filter static timer (GT).
(Step S416)
If a reset signal is being input from the outside, or if the value on the acceleration low-pass filter static timer (GT) is smaller than "0," step S417 is reached. Otherwise, the process is terminated.
(Step S417)
The value "0" is set to the acceleration low-pass filter static timer (GT), and the process is terminated.

The operation flowchart of the output control part 203 is explained below with FIG. 6. A function which outputs a pattern corresponding to the operational status as the sensor output when the operational status is unstable will be referred to as the output mask function hereunder. When the time TD required for the low-pass filter to reach a static state is set to "0," the processing of the output mask function is inhibited (output mask OFF) and the sensor signal is continuously output. When the time TD is set to a value other than "0," the processing of the output mask function is carried out (output mask ON).
(Step S501)
If the output mask is OFF (if the time TD required for the low-pass filter to reach a stable state is "0"), or the acceleration low-pass filter static timer (KT) and angular velocity low-pass filter static timer (YT) are both set to "0," step S502 is reached. Otherwise, step 503 is reached.
(Step S502)
The sensor output is stored into an angular velocity sensor output buffer.

The time TD required for the low-pass filter to reach a static state following startup is set to the startup low-pass filter static timer.
(Step S503)
If the output mask is OFF, or the startup low-pass filter (LPF) static timer (KT) and acceleration low-pass filter (LPF) static timer (GT) are both set to "0," step S504 is reached. Otherwise, step 505 is reached.
(Step S504)
The sensor output is stored into an acceleration sensor output buffer.
(Step S505)
If the output mask is ON (if the time TD required for the low-pass filter to reach a stable state is not "0") and diagnosis mode is "1" (initial diagnosis state), step S506 is reached. Otherwise, step S508 is reached.
(Step S506)
A hexadecimal fixed value "7FFF" is stored into the angular velocity sensor output buffer.
(Step S507)
The hexadecimal fixed value "7FFF" is stored into the acceleration sensor output buffer.
(Step S508)
If all the following conditions are met, step S509 is reached: the output mask is ON; diagnosis mode is "0" (normal operational status); and if the startup low-pass filter static timer (KT) is set to a value other than "0." Otherwise, step S510 is reached.
(Step S509)
A hexadecimal fixed value "8001" is stored into the angular velocity sensor output buffer.
(Step S510)
The hexadecimal fixed value "8001" is stored into the acceleration sensor output buffer.
(FIG. 6: Step S511)
If all the following conditions are met, step S512 is reached: the output mask is ON; the startup low-pass filter static timer (KT) is set to "0"; and the angular velocity low-pass filter static timer (YT) is set to a value other than "0." Otherwise, step S513 is reached.
(FIG. 6: Step S512)
The hexadecimal fixed value "7FFF" is stored into the angular velocity sensor output buffer.
(FIG. 6: Step S513)
If all the following conditions are met, the process proceeds to step S514: the output mask is ON; the startup low-pass filter static timer (KT) is set to a value other than "0"; and the acceleration low-pass filter static timer (GT) is set to a value other than "0." Otherwise, the process is terminated.
(FIG. 6: Step S514)
The hexadecimal fixed value "7FFF" is stored into the acceleration sensor output buffer.

Figure 7:
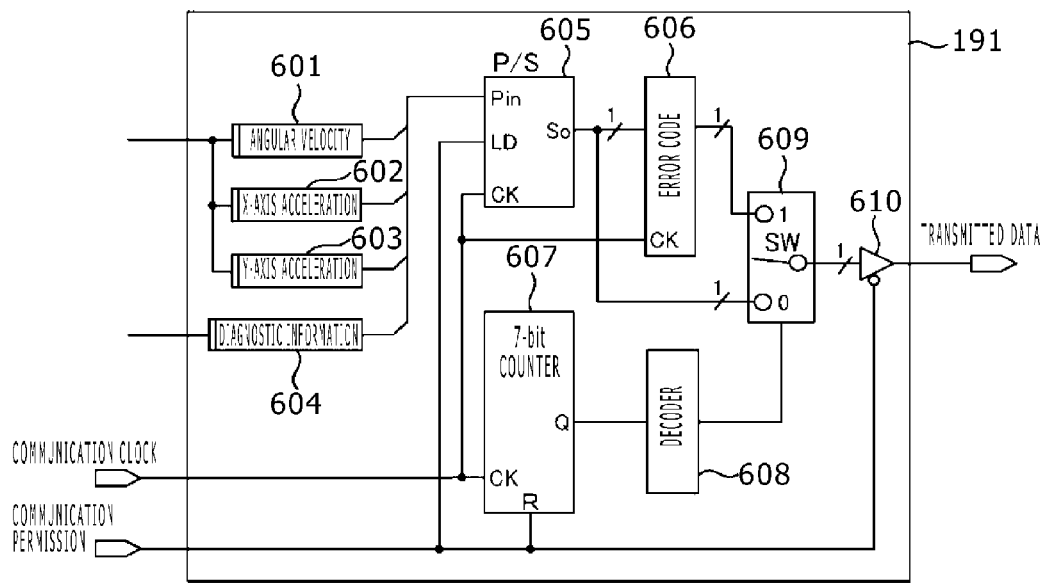
FIG. 7 is a functional block diagram of a communication part.

The processing of the communication part 191 is explained below with FIG. 7. Registers 601 to 603 store the output from the output control part 203. A register 604 stores the diagnostic information from inside the data buffer 201. A counter 607 is incremented by "1" every time a communication clock is input. A parallel-serial converter 605 is a function that converts a total of 64-bit parallel data output from the registers 601 through 604 into one-bit serial data. An error code generation part 606 is a function that generates error code for detecting communication error caused by noise in four items of output data over the communication channel between the transmission side and the reception side. A decoder 608 is a function that outputs "1" during a period in which the output of the counter 607 is from 64 to 79, and outputs "0" in any other period. A switch 609 is a function that selects the input from the error code generation part 606 when the decoder 608 outputs "1" and selects the input from the parallel-serial converter 605 at other times. An output driver 610 is a function that outputs the output of the switch 609 to the outside as transmitted data when a communication permission signal is "L" (Low), and puts the output in the high-impedance state when the communication permission signal is "H" (High).

Figure 8:
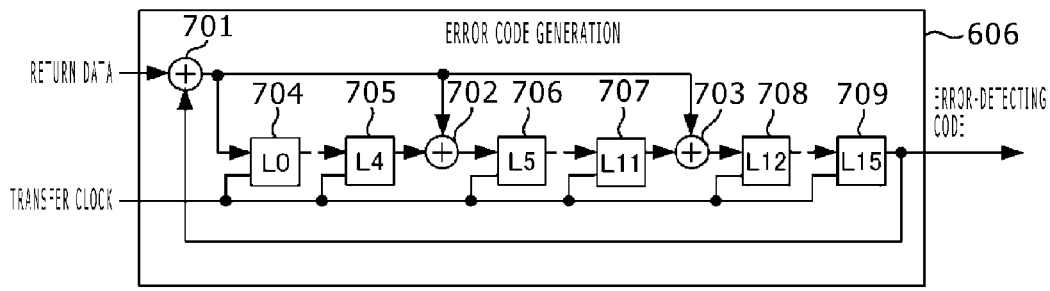
FIG. 8 is a functional block diagram of an error code part.

FIG. 8 illustrates the function of generating a CRC (cycle redundancy check) error-detecting code as an example of error code generation. Adders 701, 702, and 703 constitute a function that adds up two items of input data. Latch circuits 704 through 709 make up a function for holding input data at leading edges of a transfer clock. Although not all shown in FIG. 8, a total of 16 latch circuits L0 through L15 form a bit shift circuit. Four items of 16-bit parallel data (a total of 64 bits) retained in the registers 601 through 604 are input bit by bit with a transmission clock, whereby the error-detecting code is output one bit at a time.

Figure 9:
FIG. 9 is a diagram showing the format in which the communication part transmits data.

The workings involved will now be explained. FIG. 9 is a timing chart of communication with this embodiment. When a transfer clock is input from an external device on the reception side, the data held in the registers 601 through 604 are output one bit at a time up to the 64th clock pulse. Between the 65th clock pulse and the 80th clock pulse, error-detecting codes regarding the above-mentioned four items of data are output. Using a fifth error-detecting code, the external device on the receiving side verifies whether there is any error in the above four items of data over the transmission channel. The transfer clock is again input and the above-described data communication is carried out one more time when an error is detected.

FIG. 10 shows examples of transmitted data corresponding to the operational status output from the communication part 191. It should be noted that, of the five items of transmitted data shown in FIG. 9, the fifth data item has its error code omitted.

(1) At Startup
Following the input of a reset signal from the outside, when at least one of the diagnosis parts 161, 162, and 163 outputs "1" (FAIL) during the transition of the sensors to a steady operational status, the operation determination part 202 determines that a startup is in progress, so that the startup diagnosis flag is set to "1." As a result, the output control part 203 outputs hexadecimal "8001" representing all of the angular velocity data and the acceleration data in the X and Y directions during that period. Hexadecimal "000C" is output as the fourth diagnosis data item because bit b7 (drive frequency abnormal) and bit b6 (drive amplitude abnormal) in the diagnosis flags 2001 shown in FIG. 3 are both "1." Following the transition from the startup state to the steady operational status, hexadecimal "7FFF" is output to represent all of the angular velocity data and the acceleration data in the X and Y directions during the period (set as TD) in which the low-pass filters in the angular velocity characteristic correction part 139, X-axis direction acceleration characteristic correction part 140, and Y-axis direction acceleration characteristic correction part 141 have yet to output static values. Also, hexadecimal "0000" is output as the fourth diagnosis data item because of the transition from the startup state to the steady state. Thereafter, with the low-pass filters outputting correct values, all detected angular velocity data and acceleration data in the X and Y directions are output.

(2) When the Result of Initial Diagnosis of Acceleration is Normal

Following the input of an initial diagnosis start signal from the outside, initial diagnosis is carried out on the acceleration until the next initial diagnosis start signal "Lo" is input. During that period, the operation determination part 202 determines that initial diagnosis is under way, so that the initial diagnosis flag is set to "1." As a result, the output control part 203 outputs the sensor output as the angular velocity data and hexadecimal "7FFE" as the acceleration data in the X and Y directions. Hexadecimal "0001" is output as the fourth diagnosis data because bit b0 (initial diagnosis mode) is "1" in the diagnosis flags 2011 shown in FIG. 3. Following the transition from the initial diagnosis state to the steady operational status, hexadecimal "8001" is output as the acceleration data in the X and Y directions during the period (set as TD) in which the low-pass filters in the X-axis direction acceleration characteristic correction part 140 and Y-axis direction acceleration characteristic correction part 141 have yet to output correct values. Thereafter, with the low-pass filters outputting correct values, the detected acceleration data in the X and Y directions are output.

(3) When the Result of Initial Diagnosis of Acceleration is Abnormal

During the period (set as TD) from the time an initial diagnosis instruction is input until the low-pass filters output correct values, the output is the same as in the case (2) above. However, hexadecimal "0002" is output as the fourth diagnosis data item because bit b1 (X acceleration diagnosis abnormal) is "1" (FAIL) in the diagnosis flags 2011 shown in FIG. 3. Thereafter, it is determined that the result of initial diagnosis is abnormal, so that hexadecimal "7FFF" is output from the acceleration data in the X and Y directions. Also, the fourth diagnosis data item remains "0002."

(4) When the Result of Angular Velocity Diagnosis is Abnormal

If angular velocity diagnosis turns out to be "1" (FAIL) during normal operation, hexadecimal "7FFF" is output as the angular velocity data. The detected acceleration values are output as the acceleration data in the X and Y directions. Hexadecimal "0020" is output as the fourth diagnosis data because bit b5 (angular velocity detection abnormal) is set to "1" (FAIL) in the diagnosis flags 2011 shown in FIG. 3. After bit 5 (angular velocity detection abnormal) is set to "0" (PASS) in the diagnosis flag 2011, hexadecimal "7FFF" is output as the angular velocity data during a settling-down time (TD) of the angular velocity low-pass filter. Thereafter, the detected angular velocity value is output from the angular velocity data.

According to the above-described configuration, if the sensors are in a steady operational status and the results of fault diagnoses are normal, the sensor detected signals and fault diagnosis information may be output to the output terminals as explained above. If the sensors are in a non-steady operational status or the results of fault diagnoses are abnormal, the signals representing the operational status of the sensors and the fault diagnosis information may be output to the output terminals.

The sensor outputs of high accuracy can be provided when the sensor results are arranged to be transmitted only in the steady state. Furthermore, the external device adopts only the sensor detected results indicative of "normal" fault diagnosis results, whereby the reliability of the received sensor signals will be enhanced.

REFERENCE NUMERALS

101 Angular velocity sensor
102, 128 and 129 Oscillator
103, 106-109 Fixed electrode
104, 105, 131-133 Electrode
110, 112, 135 and 136 Capacitance detector
122 VCO
123 Clock generation part
137 Temperature sensor
138 A/D converter
139 Angular velocity characteristic correction part
140 X-axis direction acceleration characteristic correction part
141 Y-axis direction acceleration characteristic correction part
145 and 146, 148 and 149 A/D converter
151 Drive frequency adjustment part
152 Drive amplitude adjustment part
153 Angular velocity detection part
161-165 Diagnosis part
167 Diagnosis voltage control part
171 Sensor signal output part
180 Microcomputer
181 CPU
182 ROM
183 RAM
191 Communication part
201 Data buffer
202 Operation determination part
203 Output control part
601-604 Register
605 Parallel-serial converter
606 Error code generation part
607 Counter
608 Decoder
609 Switch
610 Output driver
701-703 Adder
704-709 Latch circuit

The invention claimed is:

1. A sensor signal output apparatus, comprising:
   a sensor detecting a physical quantity;
   a diagnosis part diagnosing running status of the sensor; and
   a communication part transmitting a result of detection by the sensor and a result of diagnosis by the diagnosis part;
   wherein, when the diagnosis part diagnoses that a low pass filter is in a settling down time, the communication part sends a signal which indicates that the low pass filter is in the settling down time, and sends the result of detection by the sensor at a predetermined time after the settling down time is finished.

2. A sensor signal output apparatus according to claim 1, wherein the communication part outputs the result of diagnosis by the diagnosis part along with at least one of the result of detection by the sensor and the operational status of the sensor.

3. A sensor signal output apparatus according to claim 1, wherein the operational status of the sensor includes any one of a startup state, an initial diagnosis state, a failed state, and a non-static state of output filter, and
   wherein the diagnosis part determines that the low pass filter is in the settling down time when an end of a diagnosis term, an end of a starting term, or a return to normal mode from abnormal mode is detected.

4. A sensor signal output apparatus according to claim 1, wherein the sensor detects at least one of angular velocity and acceleration.

5. A sensor signal output apparatus according to claim 1, wherein the signal indicative of the operational status of the sensor is a value outside the range of the sensor signal that is output at a time of steady operation.

6. A sensor signal output apparatus according to claim 1, wherein the communication part includes a single signal output terminal.

* * * * *